United States Patent
Dwyer et al.

(10) Patent No.: US 9,250,098 B2
(45) Date of Patent: Feb. 2, 2016

(54) SYSTEMS AND METHODS FOR DISPLAYING HEADING-BASED LEG SYMBOLOGY

(75) Inventors: David Dwyer, Scottsdale, AZ (US); William Ray Gilliland, Jr., Glendale, AZ (US)

(73) Assignee: HONEYWELL INTERNATIONAL INC., Morris Plains ( * ) Notice: Subject to any disclaimer, the term of this patent is extended or adjusted under 35 U.S.C. 154(b) by 1903 days.

(21) Appl. No.: 12/342,534

(22) Filed: Dec. 23, 2008

(65) Prior Publication Data

US 2010/0156674 A1 Jun. 24, 2010

(51) Int. Cl.
*G01C 21/00* (2006.01)
*G01C 23/00* (2006.01)

(52) U.S. Cl.
CPC .................... *G01C 23/00* (2013.01)

(58) Field of Classification Search
CPC ........................................ G01C 23/00
USPC ................................. 340/945–983
See application file for complete search history.

(56) References Cited

U.S. PATENT DOCUMENTS

| | | | |
|---|---|---|---|
| 3,521,228 A | 7/1970 | Congleton et al. | |
| 3,648,230 A * | 3/1972 | Younkin | 340/979 |
| 3,786,505 A | 1/1974 | Rennie | |
| 3,994,456 A | 11/1976 | Post et al. | |
| 4,283,705 A * | 8/1981 | James et al. | 340/973 |
| 4,467,643 A | 8/1984 | McElreath | |
| 4,692,869 A | 9/1987 | King et al. | |
| 4,792,906 A | 12/1988 | King et al. | |
| 4,999,782 A | 3/1991 | BeVan | |
| 5,008,825 A | 4/1991 | Nadkarni et al. | |
| 5,844,503 A * | 12/1998 | Riley et al. | 340/945 |
| 6,020,832 A * | 2/2000 | Jensen | 340/970 |
| 6,057,786 A * | 5/2000 | Briffe et al. | 340/975 |
| 6,112,141 A | 8/2000 | Briffe et al. | |
| 6,405,107 B1 | 6/2002 | Derman | |
| 6,867,711 B1 | 3/2005 | Langner et al. | |
| 7,215,256 B2 * | 5/2007 | Reusser et al. | 340/975 |
| 7,840,315 B2 * | 11/2010 | Baxter | 701/3 |
| 2006/0238377 A1 * | 10/2006 | Stiles et al. | 340/979 |
| 2007/0030174 A1 * | 2/2007 | Randazzo et al. | 340/979 |
| 2007/0085707 A1 * | 4/2007 | Wyatt | 340/979 |
| 2007/0182590 A1 | 8/2007 | Younkin | |
| 2008/0004757 A1 | 1/2008 | Ingram et al. | |
| 2008/0125921 A1 | 5/2008 | Baxter | |

OTHER PUBLICATIONS

EP Search Report for Application No. 09 178 242.5 dated Nov. 15, 2013.
EP Examination Report for Application No. 09 178 242.5 dated Dec. 12, 2013.

* cited by examiner

*Primary Examiner* — Steven Lim
*Assistant Examiner* — Omeed Alizada
(74) *Attorney, Agent, or Firm* — Ingrassia Fisher & Lorenz, P.C.

(57) ABSTRACT

An aircraft display system includes a processor configured to receive a heading-based leg and to generate display signals based on the heading-based leg; and a display device including a horizontal situation indicator coupled to the processor. The horizontal situation indicator receives the display signals from the processor and displaying symbology representing the heading-based leg.

10 Claims, 5 Drawing Sheets

SYSTEMS AND METHODS FOR DISPLAYING HEADING-BASED LEG SYMBOLOGY

TECHNICAL FIELD

The present invention generally relates to aircraft display systems and methods, and more particularly relates to systems and methods for displaying symbology for heading-based legs of flight plans.

BACKGROUND

An important facet of aviation safety is the pilot's situational awareness of the status of the aircraft, including its position, velocity, and external factors such as wind direction and terrain. Toward this end, advances in human factors research have led to dramatic improvements in the display of information to the pilot. Further, advances in visual display technology, such as high quality flat display panels, have enabled the pilot to be presented with information in a visual format that is not possible with traditional dials and gauges.

During operation, the aircraft's heading corresponds to the horizontal component (perpendicular to the local gravity vector) of the direction in which the aircraft is pointing. If the aircraft is flying in wind that has a velocity component at an angle to the heading, the aircraft's direction of flight will change according to a drift angle that is proportional to the speed of the aircraft and the speed of the perpendicular component of the wind velocity. The resulting horizontal direction of the aircraft's motion along the ground is referred to as ground track (hereinafter "track").

One of the primary flight displays the pilot uses on the flight deck to determine whether the aircraft is on the planned flight path is a horizontal situation indicator (HSI). One function of the HSI is to provide a visualization of the position of the aircraft with respect to a VOR (VHF Omnidirectional Range) radial signal broadcast by a VOR station. The HSI also has a compass card that displays the direction of the aircraft relative to the earth's magnetic field. During flight, the pilot uses the HSI to verify the location of the aircraft against the flight plan.

Most flight plan path procedures are based on ground track, and the flight management system of the aircraft provides navigation information to the HSI that is based on ground track. As such, the information provided to the HSI by the FMS is based on a track-based flight plan. However, at times, air traffic controllers direct the aircraft to fly a heading-based flight plan path. In these situations, pilots must typically mentally convert the track-based indications provided by the HSI into the designated heading-based path, and manually fly the heading-based flight plan path.

Accordingly, it is desirable to provide systems and methods that display symbology for heading-based legs of a flight plan. In addition, it is desirable to provide an HSI with symbology for heading-based legs. Furthermore, other desirable features and characteristics of the present invention will become apparent from the subsequent detailed description of the invention and the appended claims, taken in conjunction with the accompanying drawings and this background of the invention

BRIEF SUMMARY

In accordance with an exemplary embodiment, an aircraft display system includes a processor configured to receive a heading-based leg and to generate display signals based on the heading-based leg; and a display device including a horizontal situation indicator coupled to the processor. The horizontal situation indicator receives the display signals from the processor and displaying symbology representing the heading-based leg.

In accordance with another exemplary embodiment, a method for displaying symbology for a heading-based leg includes receiving a signal associated with a heading-based leg; and displaying symbology on a horizontal situation indicator associated with the heading-based flight leg.

In accordance with yet another exemplary embodiment, a horizontal situation indicator for an aircraft display system includes a compass card configured to display a current heading of the aircraft based on signals from a heading source; and symbology on the compass card indicating a desired heading based on a heading-based leg.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein provide systems and methods for displaying symbology associated with heading-based legs. More specifically, exemplary embodiments include a horizontal situation indicator (HSI) with symbology indicating the heading-based leg. The symbology can include an arrow pointing in the direction of the designated heading-based leg; a text-based indicator of the designated heading-based leg; and/or a heading indicator showing the designated heading-based leg.

Figure 1:
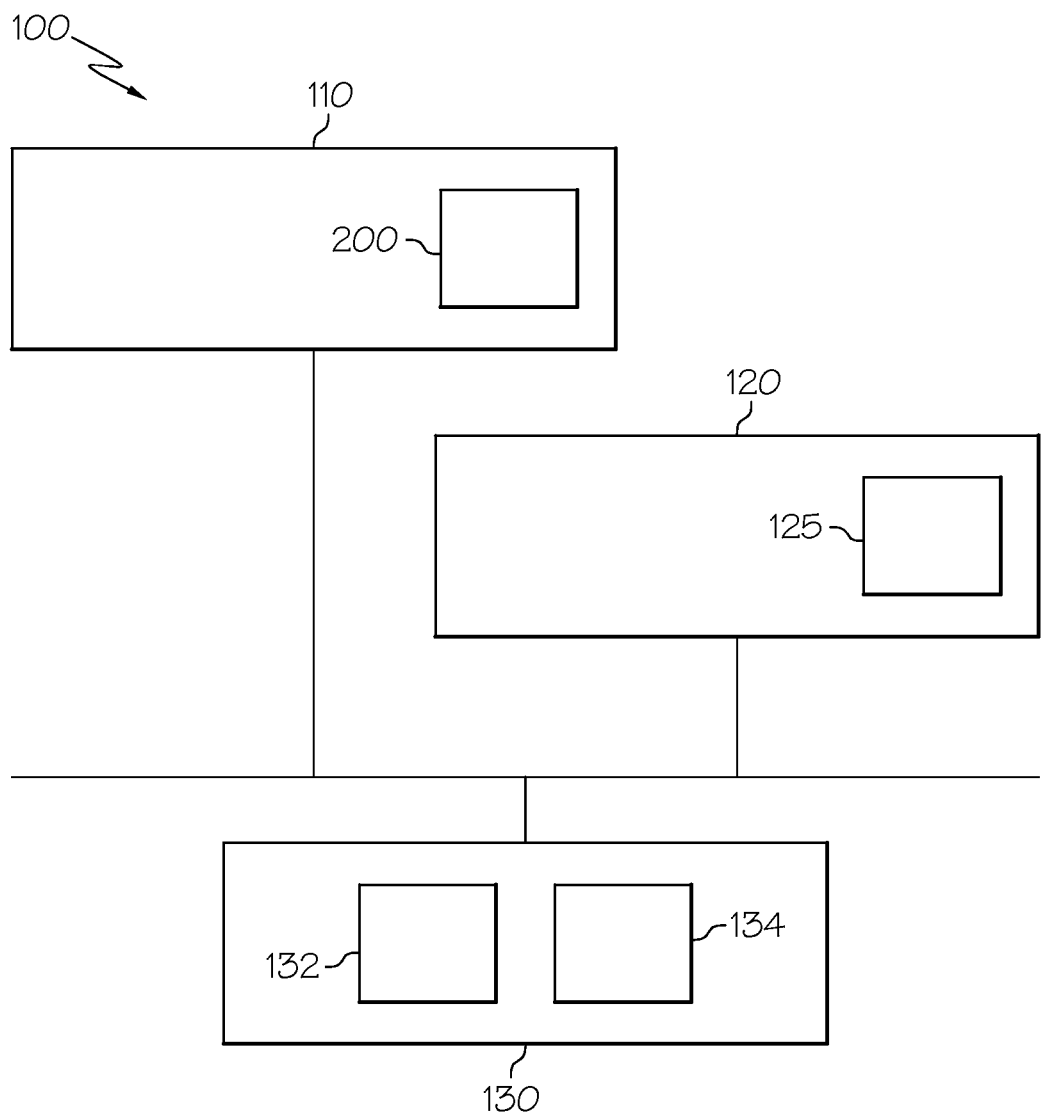
FIG. 1 is a functional block diagram of a system for displaying symbology associated with heading-based flight plan paths in accordance with an exemplary embodiment.

FIG. 1 is a system 100 for displaying symbology for heading-based flight plan paths in accordance with an exemplary embodiment. The system 100 includes a display device 110, which includes a horizontal situation indicator (HSI) 200, discussed in greater detail below; a processor 120 having a memory 125; and a flight management system 130, which may include a Global Positioning System (GPS) 132 and an Inertial Reference System (IRS) 134. The flight management system 130 may also receive data from sources such as air data, AHRS, VORs, DMEs, TACANs, MLS, ILS, LORAN-C, and ADF. Although the system 100 appears in FIG. 1 to be arranged as an integrated system, the system 100 is not so limited and can also include an arrangement whereby one or more of the display device 110, processor 120, and flight management system 130 are separate components or sub-components of another system located either onboard or external to the aircraft. Moreover, exemplary embodiments of the system 100 can also be utilized in spacecraft, ships, submarines, fixed wing and rotor aircraft, as well as other types of vehicles that are affected by wind or other forces that may cause the vehicle to drift. For simplicity, embodiments are described with reference to "aircraft."

The display device 110 may be one of any number of electronic display devices for use in a cockpit. The HSI 200 may be displayed in a dedicated video display panel, or may be incorporated into a more comprehensive information display. The more comprehensive information display may include other information, such as a moving map, a projection of terrain and obstacles, and an attitude indicator.

The processor 120 may be an independent processor that receives information from the flight management system and supplies control commands to the HSI 120. In other embodiments, the processor 120 may form part of the flight management system 130 or the display device 110. The processor 120 may include a data communications device or network interface (hereinafter "interface"), by which it may communicate with the flight management system 130, and the display device 110. The processor 120 is associated with the memory 125, which has a computer readable medium encoded with software for performing processes associated with the exemplary embodiments discussed herein (hereinafter "the software"). Among other things, the software includes a program or programs for representing, manipulating, and displaying the HSI 200, as discussed in further detail below. The memory 125 may be integrated with the processor 120, or it may be remotely located, whereby the processor 120 accesses the memory 125 via a network connection.

The flight management system 130 is coupled to processor 120, and can provide navigation data associated with the aircraft's current position and velocity and flight direction (e.g., heading, course, track, etc.) to the processor 120. The navigation data provided to the processor 120 can also include information about the aircraft's airspeed, altitude, pitch, and other important flight information. In exemplary embodiments, the flight management system 130 can include any suitable position and direction determination devices that are capable of providing the processing unit 120 with at least an aircraft's current position (e.g., in latitudinal and longitudinal form), the real-time direction (heading, course, track, etc.) of the aircraft in its flight path, the waypoints along the flight path, and other important flight information (e.g., pitch, airspeed, altitude, attitude, etc.).—In general, the flight management system 130 is capable of providing real-time track and heading information. The flight management system 130 further provides track-based or heading-based flight plan paths, including turn direction, heading to be flown, deviation from heading, allowed deviation, termination point of heading leg, and auto/manual control for turning the aircraft.

In general, the flight management system 130 provides a flight plan made up of one or more legs. In exemplary embodiments, the flight management system 130 provides heading-based legs, as required or desired by the pilot, ground control, or another party or system. The heading-based legs can be legs dictated by industry specifications such as ARINC 424. Alternatively, heading-based legs can include any flight path defined according to heading. Conventionally, display devices such as HSIs have displayed track-based legs provided by a flight management system.

Figure 2:
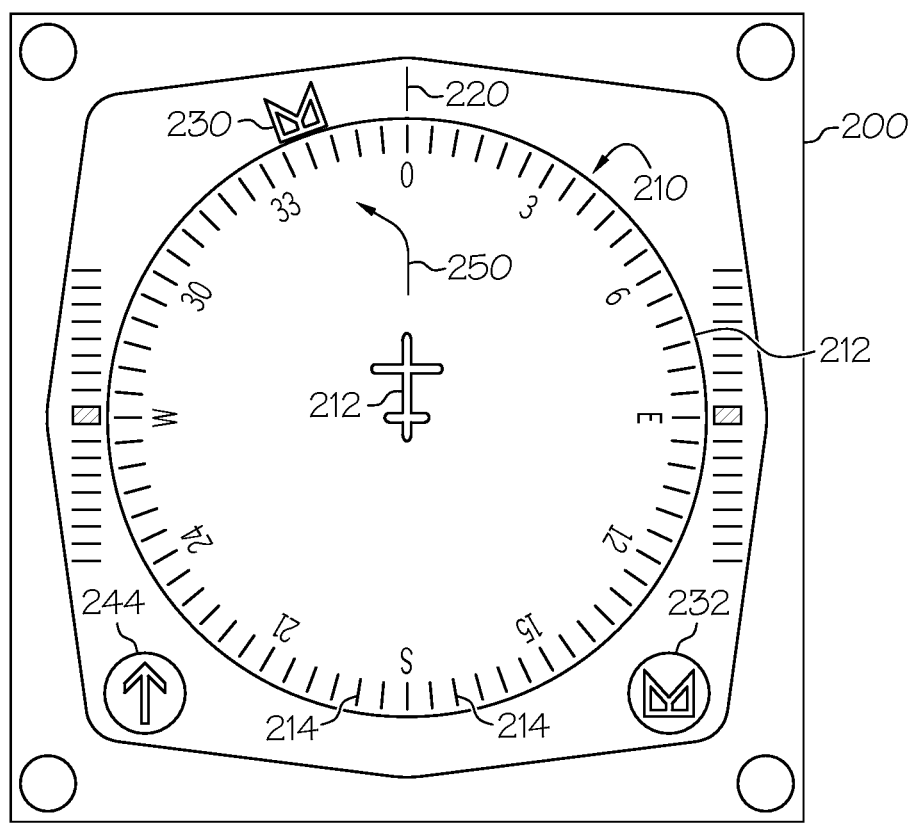
FIG. 2 is a horizontal situation indicator (HSI) of the system of FIG. 1 in accordance with an exemplary embodiment.

FIG. 2 illustrates an HSI 200 in accordance with an exemplary embodiment. In the illustrated embodiment, the HSI 200 is a dedicated HSI, and may be a digital display or an electromechanical device. In general, the HSI 200 may be any type of display that displays the horizontal situation of the aircraft, and may include horizontal situational displays on synthetic vision systems (SVS), including perspective views, head-up displays (HUD), and/or attitude direction indicators (ADI). In one embodiment, the HSI 200 can merely be a text-based indication of the intended heading.

In this embodiment, the HSI 200 has a compass card 210 that visually indicates an orientation of the earth's magnetic field. The compass card 210 rotates as the pilot banks the airplane away from the current direction. The compass card 210 has a compass perimeter 212 and a number of radial measurement indicia 214 that are located along the compass perimeter 212. An actual heading of the aircraft is determined by the alignment of a heading indicator 220, commonly referred to as a "lubber line," to the radial measurement indicia 214. For example, as seen in FIG. 2, the radial measurement indicia 214 are aligned with the heading indicator 220 at 0°. Thus, the actual heading of the aircraft is 0°, or due north. The heading is also indicated by the orientation of the compass card relative to the aircraft representation 202. The compass card 210 may take a different shape, such as a linear scale.

With continued reference to FIG. 2, the HSI 200 has an adjustable heading bug 230. The heading bug 230 is in operable communication with a heading adjustment control 232, commonly referred to as a heading select knob, such that the heading bug 230 can be adjusted by manipulation of the heading adjustment control 232. In this embodiment, the heading bug 230 is selectively positioned along the compass perimeter 212. Thus, when the heading bug 230 is positioned along the compass perimeter 212 with respect to the radial measurement indicia 214, it rotates with the compass card 210. In some embodiments, the relationship between the heading bug 230 and the radial measurement indicia 214 indicates a desired heading of the aircraft, although it must usually be set by hand. That is, the pilot moves the heading bug 230 along the radial measurement indicia 214 to the desired heading. Once the heading bug 230 is positioned, the pilot has a reminder of which direction the aircraft should be oriented. For example, as seen in FIG. 2, the desired heading is 340° as determined by the position of the heading bug 230 with respect to the radial measurement indicia 214. Therefore, knowing that the actual heading is 0° and the desired heading is 340°, the pilot knows to bank the aircraft left to bring the aircraft to the desired heading, thus bringing the heading bug 230 into alignment with the heading indicator 220.

As previously mentioned, and as will now be discussed in further detail, the HSI 200 includes symbology that indicates a heading-based leg that form part of the flight plan. In the depicted exemplary embodiment of FIG. 2, the HSI 200 includes arrow 250 that is a turn arrow to indicate the appropriate heading-based leg based on signals from the flight management system 130 (FIG. 1). In other words, if the arrow 250 is pointing to the left, the pilot should direct the aircraft to the left in order to comply with the designated heading-based leg. Similarly, the arrow 250 can point straight ahead to indicate that the aircraft is correctly flying the heading-based leg, or to the right to indicate that the appropriate heading-based leg is to the right of the aircraft.

As noted above, the aircraft is typically in a track-based mode in which the flight plan paths are based on track. However, at times, the aircraft may be in a heading-based mode in which the flight plan paths are based on heading. The appearance of the arrow 250 may additionally serve to indicate to, or remind, the pilot that the pilot that the aircraft is the heading-based mode. Other signals that indicate to the pilot that the HSI 200 is showing heading-based flight plan paths include color changes.

In an alternate embodiment, the heading bug 230 may be automatically adjusted based on the heading-based flight plan path. In this embodiment, the heading bug 230 is controlled by the processor 120 (FIG. 1) and represents heading-based leg symbology.

Figure 3:
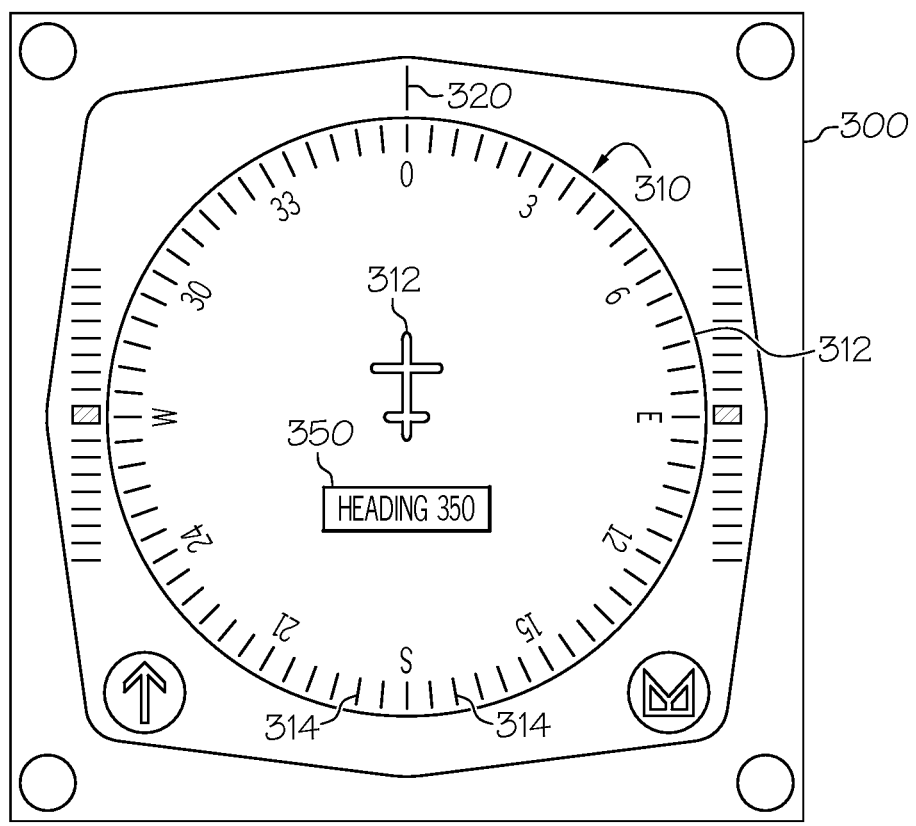
FIG. 3 is an HSI of the system of FIG. 1 in accordance with another exemplary embodiment.

FIG. 3 illustrates an HSI 300 in accordance with another exemplary embodiment. As in FIG. 2, the HSI 300 has an aircraft representation 302 and a compass card 310 with a compass perimeter 312 and a number of radial measurement indicia 314 that are located along the compass perimeter 312. In the depicted exemplary embodiment of FIG. 3, the HSI 300 includes text-based symbology 350 that indicates the appropriate heading-based leg, which in this case is heading 350°. As in FIG. 2, the appearance of the text-based symbology 350 may additionally serve to indicate to the pilot that the pilot that the aircraft is the heading-based mode. In a further embodiment, the aircraft representation 302 and compass card 312 are not displayed, and the HSI 300 includes merely a text-based message, such as symbology 350 to convey the heading-based leg to the pilot of the aircraft.

Figure 4:
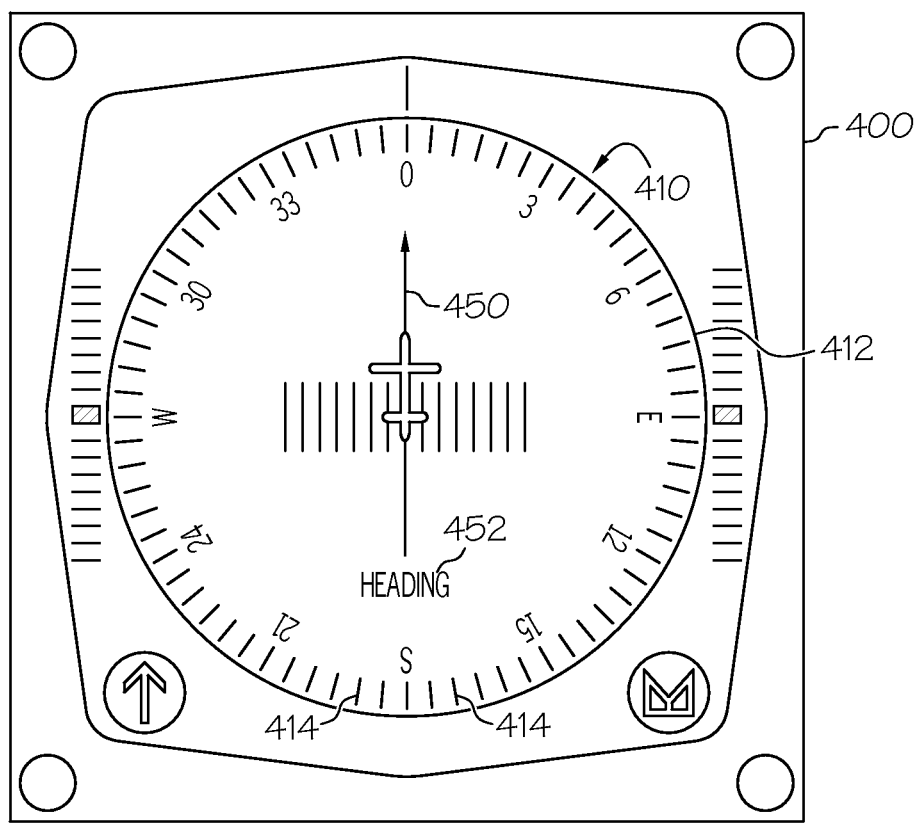
FIG. 4 is an HSI of the system of FIG. 1 in accordance with another exemplary embodiment.

FIG. 4 illustrates an HSI 400 in accordance with another exemplary embodiment. As in FIG. 2, the HSI 400 has compass card 410 with a compass perimeter 412 and a number of radial measurement indicia 414 that are located along the compass perimeter 412. In this embodiment, a heading indicator 450 indicates orientation of a heading-based leg relative to the compass card 410. To appropriately indicate that the aircraft is in a heading-based mode, heading symbology 452 is also displayed on the HSI 400.

Figure 5:
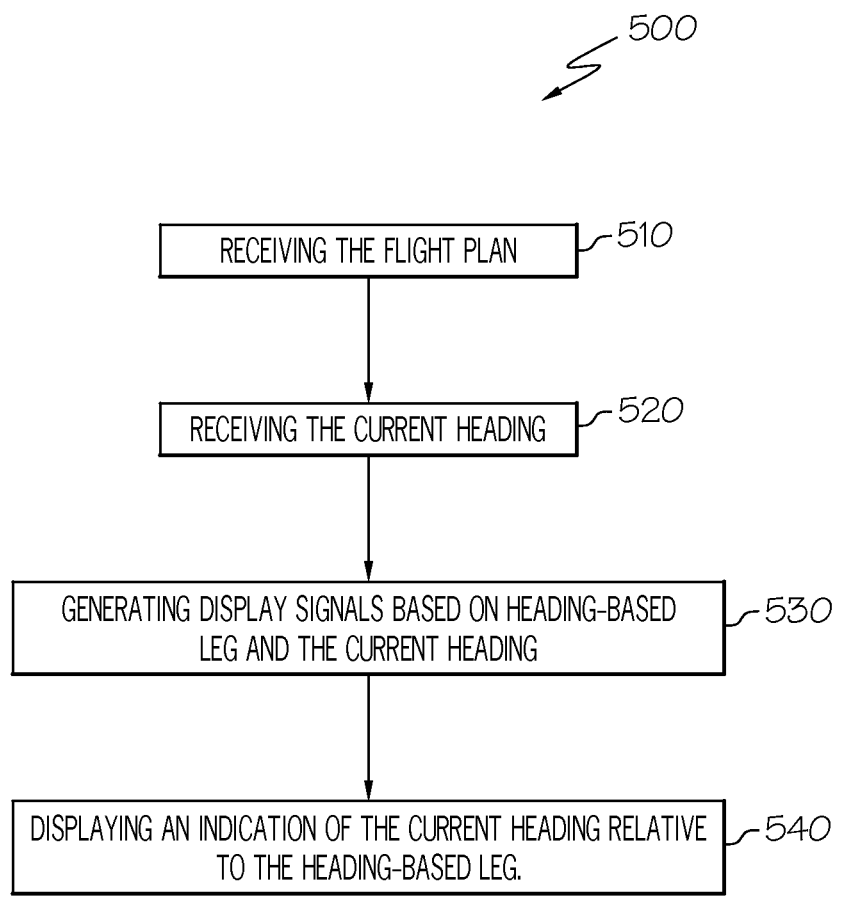
FIG. 5 is a method for displaying symbology for heading-based legs in accordance with an exemplary embodiment.

FIG. 5 illustrates an exemplary method 500 for displaying symbology for heading-based flight paths. In a first step 510, the processor 120 receives the designated flight plan legs from the flight management system 130. The flight plan legs may be required by air traffic control or a published procedure, or chosen by the pilot. In this embodiment, at least some of the flight plan legs are heading-based legs.

In a second step 520, the processor 120 receives the current heading from flight management system 130. In a third step 530, the processor 120 generates display signals based on the heading-based legs and the current heading, and supplies the display signals to the display devices, including the HSI 200. In a fourth step 540, the HSI 200 provides an indication of the current heading relative to the heading-based leg. This can include, for example, symbology in the form of an arrow that indicates the direction of the heading-based leg, a text-based indication of the direction of the heading-based leg, and/or a heading indicator that indicates orientation of a heading-based leg relative to the compass card. In a fifth step 550, the HSI provides an indication that to the pilot that the HSI is displaying a heading-based leg. This can include the symbology itself or other, alternative form of symbology, such as a color change or message.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft display system, comprising;
   a processor configured to receive a heading-based leg and to generate display signals based on the heading-based leg; and
   a display device comprising a horizontal situation indicator coupled to the processor, the horizontal situation indicator receiving the display signals from the processor and displaying symbology representing the heading-based leg,
   wherein the processor is configured to selectively operate in a heading-based mode in which a flight plan is defined according to heading and a track-based mode in which the flight plan is defined according to track, and wherein the symbology indicates operation in the heading-based mode or the track-based mode.

2. The aircraft display system of claim 1, wherein the symbology includes an arrow pointing to a desired heading in accordance with the heading-based leg.

3. The aircraft display system of claim 2, wherein the arrow is a turn arrow.

4. The aircraft display system of claim 2, wherein the arrow is a heading indicator.

5. The aircraft display system of claim 1, wherein the symbology includes text.

6. The aircraft display system of claim 5, wherein the text corresponds to a desired heading according to the heading-based leg.

7. The aircraft display system of claim 1, wherein the horizontal situation indicator includes a compass card configured to display a heading of the aircraft, the symbology including a heading indicator positioned on the compass card and pointing to a desired heading in accordance with the heading-based leg.

8. The aircraft display system of claim 1, wherein the horizontal situation indicator includes a compass card with a perimeter, the symbology including a heading bug that is configured to rotate around the perimeter of the compass card based on the heading-based leg.

9. An aircraft display system, comprising;
   a processor configured to receive a heading-based leg and to generate display signals based on the heading-based leg; and
   a display device comprising a horizontal situation indicator coupled to the processor, the horizontal situation indicator receiving the display signals from the processor and displaying symbology representing the heading-based leg,
   wherein the processor is configured to selectively operate in a heading-based mode or a track-based mode, and wherein the symbology indicates operation in the heading-based mode.

10. The aircraft display system of claim 9, wherein the symbology includes a color change.

* * * * *